(12) United States Patent
Glomset et al.

(10) Patent No.: US 9,717,219 B2
(45) Date of Patent: Aug. 1, 2017

(54) WATER INLET ARRANGEMENT

(71) Applicants: Karsten Glomset, Alesund (NO); Kenneth Glomset, Alesund (NO); Ove Gjelstenli, Vatne (NO)

(72) Inventors: Karsten Glomset, Alesund (NO); Kenneth Glomset, Alesund (NO); Ove Gjelstenli, Vatne (NO)

(73) Assignee: Linde Aktiengesellschaft, Munich (DE)

( * ) Notice: Subject to any disclaimer, the term of this patent is extended or adjusted under 35 U.S.C. 154(b) by 83 days.

(21) Appl. No.: 14/175,057

(22) Filed: Feb. 7, 2014

(65) Prior Publication Data

US 2014/0216558 A1    Aug. 7, 2014

Related U.S. Application Data

(63) Continuation of application No. 12/664,082, filed on Apr. 8, 2010, now Pat. No. 8,707,988.

(30) Foreign Application Priority Data

May 6, 2008   (WO) ................. PCT/EP2008/003631

(51) Int. Cl.
  *A01K 63/00*   (2017.01)
  *A01K 63/04*   (2006.01)
  *A01K 61/00*   (2017.01)

(52) U.S. Cl.
  CPC ............ *A01K 63/006* (2013.01); *A01K 61/00* (2013.01); *A01K 63/00* (2013.01); *A01K 63/042* (2013.01); *Y10T 137/0318* (2015.04); *Y10T 137/85938* (2015.04); *Y10T 137/86372* (2015.04); *Y10T 137/87249* (2015.04)

(58) Field of Classification Search
  CPC ... A01K 63/006; A01K 63/045; A01K 63/042
  USPC ................. 210/167.26, 221.2; 119/263, 261; 267/77, 124; 261/76, 77, 79.2, 83; 251/302, 235, 340
  See application file for complete search history.

(56) References Cited

U.S. PATENT DOCUMENTS 2,602,465 A    7/1952   Goehring
3,601,320 A    8/1971   Plessis
3,610,538 A    10/1971  Enders
(Continued)

FOREIGN PATENT DOCUMENTS

EP    2 008 513 A1    12/2008
EP    2 198 704 A1    6/2010
(Continued)

OTHER PUBLICATIONS

Steinar Skybakmoen, Fish Rearing Tanks, Sintef NHL Norwegian Hydrotechnical Laboratorium Brochure, Apr. 1991, pp. 1-13, Publisher: AGA AS, Oslo, Norway.
(Continued)

*Primary Examiner* — Craig Schneider
*Assistant Examiner* — Angelisa L Hicks
(74) *Attorney, Agent, or Firm* — Joshua L. Cohen

(57) ABSTRACT

The invention relates to a water inlet arrangement for the use in fish tanks in aquaculture, including a pipe to feed water into the tank, the pipe having a plurality of openings and, for a better adjustment of the flow, a surrounding second element having a plurality of openings and/or a fixed or adjustable shield are provided.

9 Claims, 5 Drawing Sheets

(56) References Cited

U.S. PATENT DOCUMENTS

Figure 1:
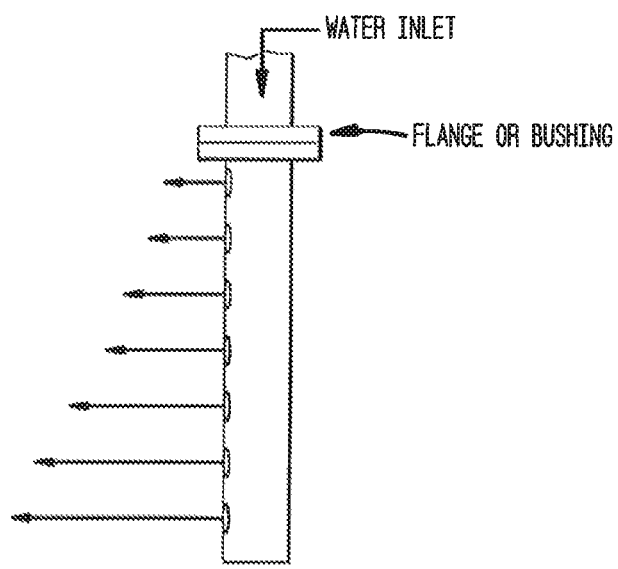

| | | | |
|---|---|---|---|
| 3,777,987 A | 12/1973 | Allport | |
| 3,841,999 A * | 10/1974 | Bennett et al. | 210/617 |
| 4,177,226 A * | 12/1979 | Danel | 261/124 |
| 4,215,082 A * | 7/1980 | Danel | 261/124 |
| 4,556,523 A * | 12/1985 | Lecoffre | B01F 3/04099 |
| | | | 209/170 |
| 4,915,828 A | 4/1990 | Meyers et al. | |
| 5,055,186 A | 10/1991 | Van Toever | |
| 5,066,394 A * | 11/1991 | Harrison | A01K 63/06 |
| | | | 119/261 |
| 5,174,239 A * | 12/1992 | Sato | A01K 63/003 |
| | | | 119/249 |
| 5,421,383 A | 6/1995 | Schmid | |
| 5,425,723 A | 6/1995 | Wang | |
| 5,560,318 A * | 10/1996 | Yoshida | A01K 63/003 |
| | | | 119/227 |
| 5,592,969 A | 1/1997 | Reichert | |
| 5,782,299 A | 7/1998 | Simone et al. | |
| 5,799,691 A | 9/1998 | Marsch | |
| 5,840,198 A | 11/1998 | Clarke | |
| 6,488,401 B1 * | 12/2002 | Seaman | B01F 5/0218 |
| | | | 239/240 |
| 6,565,070 B2 | 5/2003 | Batterham et al. | |
| 6,659,043 B1 * | 12/2003 | Huska | A01K 63/045 |
| | | | 119/226 |
| 6,912,972 B1 * | 7/2005 | Tsai | A01K 63/042 |
| | | | 119/261 |
| 7,011,748 B2 | 3/2006 | Tsai | |
| 7,470,372 B2 | 12/2008 | Martin | |
| 7,533,874 B2 | 5/2009 | Glomset | |
| 2004/0200427 A1 * | 10/2004 | Dulaney | A01K 63/006 |
| | | | 119/261 |
| 2006/0192034 A1 | 8/2006 | Gavin | |

FOREIGN PATENT DOCUMENTS

| | | |
|---|---|---|
| JP | 2006 136777 A | 6/2006 |
| WO | WO 03/024578 A1 | 3/2003 |
| WO | WO 2008/153408 A1 | 12/2008 |
| WO | WO 2008153408 A1 * | 12/2008 ............. A01K 63/00 |

OTHER PUBLICATIONS

International Search Report for PCT/EP2008/003631, Date of Mailing: Jan. 27, 2009, Authorized Officer: C. Lucchesi-Palli, 11 pp.
European Search Report for EP 09 01 4227, Date of Mailing: Mar. 31, 2010, Authorized Office: Ulrich Deubler, 6 pp.

* cited by examiner

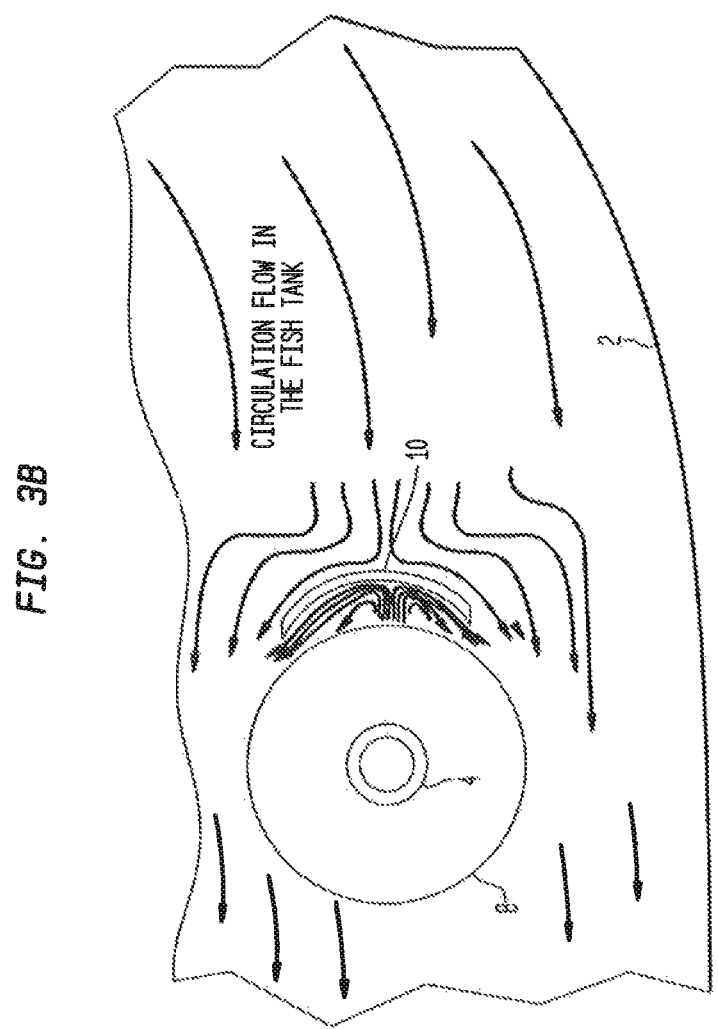

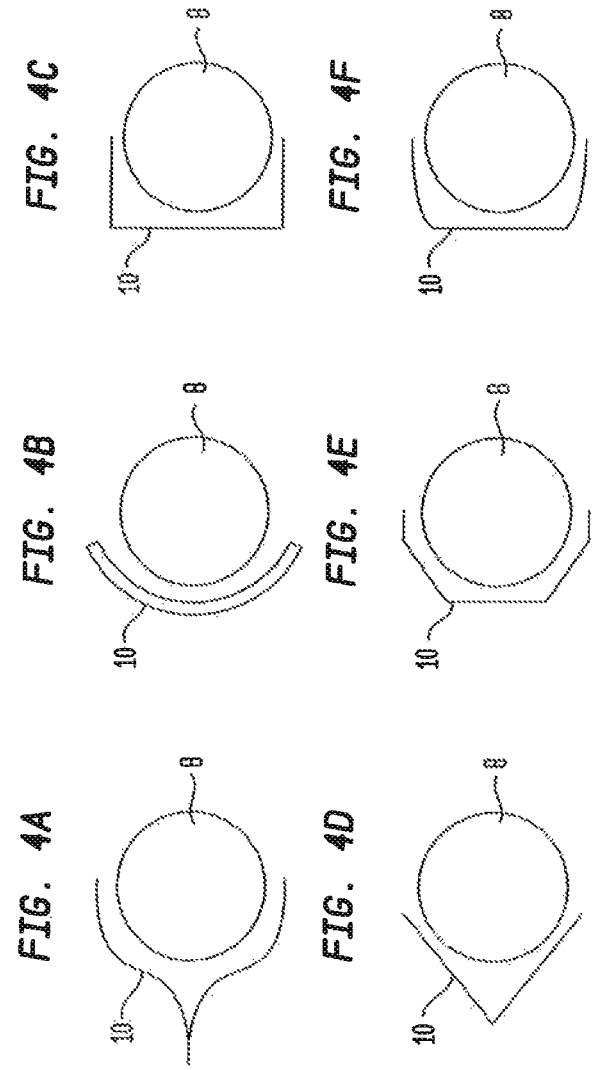

WATER INLET ARRANGEMENT

By rearing fish in tanks (closing rearing facilities for smolt and edible fish production), it is possible to exercise considerable control over the fish environment. However, the quality of the environment that can be created depends on several factors which, to a great extent, are mutually dependent.

In an enclosed rearing facility, there is a complex interaction of the following factors:
Temperature
Illumination
Density
Oxygen Content
Water flow rate
Concentration level of refuse substances
Food availability
Current generation and velocity These factors are decisive for the biological and environmental behavior pattern of the fish.

Not surprisingly, water is the most important factor in fish rearing. For example, a tank with a fish density of 60 kg of fish per cubic meter of water will consist of:
94% water, by volume
6% fish, by volume As a comparison, this is approximately the same density as observed in a crowded aircraft. Because of the cabin seat arrangement, the actual density within the aircraft is two to three times greater than the average value, without an adverse effect on comfort. Here, the cause may be that there was an abundance of fresh air and, on occasion, food is provided to each person at his/her seat, that is, without undue energy consumption and without eliciting aggressive behavior. Stated briefly, it is arranged to produce the best possible distribution of the most basic needs of our existence, with the aid of the aircraft's ventilation system and the cabin personnel.

Supply distribution of oxygen and food are also key concepts in intensive fish rearing. In this type of distribution mechanism, water is used as the transport medium. Breeding tanks may be designed in such a way that the water flowing through the rearing unit is used in the most effective manner, with regard to the best possible environment for each of the fish.

The invention is related to an inlet arrangement for fish tanks in Aquaculture, known as slot tube, water inlet arrangement, etc. Water means fresh water, aerated water or water enriched with oxygen.

The brochure: "Fish rearing tanks, Aquaculture Series" by AGA AB, S-18181 Lidingö, Sweden discloses some types of water inlet arrangements. FIG. 13 shows a simple pipe nozzle or just a open water pipe. FIG. 6 shows a vertical diffuser tube, FIG. 7 a horizontal diffuser tube and FIG. 8 a combination of vertical and horizontal diffuser tubes.

The opening/openings of the inlet arrangement have fixed openings. There is no arrangement to adjust the water flow, water speed or water energy out of the inlet arrangement.
Problems may be:
Too high hydraulic energy or to low hydraulic energy coming out of the inlet arrangement
Various hydraulic energy out of the openings of the inlet arrangement. The flow out of the pipe is larger at the bottom holes and lower at the upper holes.
Suboptimal tank hydraulics with following results:
Gradients of oxygen and metabolic wastes
Reduced self cleaning of the fish tank
Reduced distribution of food particles.

It is the object of the invention to reduce the drawbacks of the state of the art.
In especially:
Achieve a good and homogenous circulation throughout the whole water column,
Give self cleaning in the tank regarding waste products (faeces etc.).
Good and even distribution of feed particles in the tank.
Good and even distribution and mixing of oxygen in the tank.
To be able to combine independently the circulation speed and water flow in a tank.
To be able to increase efficiency of oxygenation processes.

The object is solved by a water inlet arrangement with the features of claim 1. Embodiments of the invention and a process are subjects of the depending claims.

The water inlet arrangement or apparatus is built up from an inner pipe and an outer, surrounding tube or pipe. The parts are possible to disassemble to allow proper cleaning and disinfection. The holes/openings in the inner pipe "shoots" the water out in to the volume of the outer pipe and creates a circulation/rotation/turbulence. The water from the inner pipe hits the wall of the outer pipe at a given velocity (preferably at a velocity >2 m/sec.). This forces the water to deflect and start a rotation/turbulence in the outer pipe before it flows out of the openings in the outer pipe. Instead of or additional to the surrounding pipe a shield can be used. A shield, surrounding only a part of the circumference of the pipe.

The induced rotation prevents the gas bubbles in the water flow from combining to form larger gas bubbles (coalescence). This will increase efficiency and transfer speed between gas and liquid. The rotation and the design/placement of the holes/openings in the inner pipe will equalize the water pressure in the outer pipe. This will again create equal water flow/water speed/water energy from all the holes/openings in the outer pipe.

The water inlet arrangement is constructed in such a way that the energy of the inlet water will not affect the force that is needed to rotate or adjust the direction of the water inlet arrangement around its own axis. This is to adjust the water current pattern in the tank.

This is to adjust the direction of the flow, individually in each fish tank. It is desired to have a certain flexibility to adjust the flow/current pattern in a tank to each fish size/species and situation.

The outer pipe is connected to the inner pipe by sealings or O-rings. This is done so that you can rotate the outer pipe around the inner pipe. Then the direction of the holes/openings in the outer pipe can be directed to a desired angle/direction in the fish tank. The pressure in the outer pipe is equal in all directions and results in a low torque requirement to rotate the outer pipe around the inner pipe.

Speed and flow of the water can be adjusted independently. Malformation of fish by too high impact of hydraulic jets can be avoided.

In large fish tanks of the state of the art the hydraulic energy is a problem when adjusting the direction of a slot tube. This is because hydraulic energy together with the area difference between the upper and lower end of the tube will result in a high down pressure. This pressure will increase the torque needed to rotate the inlet arrangement around it's own axis. With the invention one can easily eliminate the force this energy affect the torque needed to rotate the inlet arrangement.

The invention has the following advantages:

Easier directional flow adjustment of inlet flow by manual management of the water inlet device. Especially in large water flow and tank configurations where excessive hydraulic energy conditions exist.

Possibility to adjust water flow and circulation speed independent of each other.

The second element and/or the shield on the inlet arrangement together with the regulation valve to the fish tank allow to adjust to get an independent flow and circulation speed. This is done by regulating a given flow into a tank with the tank regulation valve. Then one adjusts the shield to the desirable circulation speed in the tank. As regulation of the shield will affect the water flow because of change in counter pressure it is important to compensate this change by adjusting the regulation valve accordingly.

The water speed from the shield and/or second element affects the existing water in the tank, and creates a circulation. When the speed is high out from the shield then the speed in the tank gets bigger. On a given flow one can decide the velocity in the tank by regulating the shield in/out from the outer pipe. This increases/reduces the area from which the water has to pass through, and also the speed of the water at a given flow.

It is possible to regulate the shield and regulation valve simultaneously to achieve the desired effect.

Reduce or take away deformities on fry/juveniles/larvae caused by water jet/jets from water inlet arrangement.

Reduce degassing in the situation where over/super saturated water is introduced to a tank, Water inlet arrangement can be disassembled for cleaning and disinfection.

The water inlet arrangement of the invention:

Provides simpler handling and adjustment of the inlet stream flow direction, independent of the amount of flow into the tank. This can be done because the pressure inside the outer pipe is equal in all directions. The outer pipe can be rotated around the inner pipe and can therefore easily be turned as long as the pressure is equal in all directions. This is especially important when the dimensions and flow rate are large into the tank.

Provides the flexibility to independently adjust water flow and water current in a tank with the adjustable shield.

Provides equal water flow and energy throughout the whole water column in a tank. This is because the water pressure and flow is equalized between each of the holes/openings that are directed to the shield or water column.

Prevents coalescence of gas bubbles because of high turbulence/rotation speed of the water within the outer pipe. This is especially important where oxygen or other gases are mixed in water in the form of small bubbles.

Provides the mechanism to deliver the correct current in the tank for efficient dissolving and distribution of gases throughout the whole tank volume. It also enables effective removal of waste products such as faeces, ammonia and $CO_2$ The pipe and/or the second element can have any shape as desired. It is of advantage, if they are cylindrical or have a polygonal cross section, like to triangle, a square, etc. The openings can have a round shape, but also it is possible to form them in any shape like oval or rectangular slots. It is of advantage to have the openings arranged in one row for generating circulation in the fish tank in a simple manner.

It is of advantage to orient the openings of the second element on the outside or in the shell of this element.

In a preferred installation the openings of the first and the second element are not directed in the same direction. Preferably directed 180 degrees in relation to each other. This is done to create a turbulence inside the outer pipe, and to get as long as possible residence time between gas and water inside the outer pipe before it is introduced into the fish tank.

In one preferred embodiment the water inlet arrangement is made with a fixed or an adjustable shield. The shield covers the water outlet holes/openings from the outer pipe of the water inlet arrangement. The shield deflects the water jets coming out of each hole/opening in the outer pipe of the water inlet arrangement. The water flow energy will be reduced as it hits the shield and the water flow is forced to spread and turn around to each side of the outer pipe of the water inlet arrangement.

If the shield is adjustable so that the clearance dimension between the shield and outer pipe of the water inlet arrangement can be adjusted, this will result in controllable and adjustable water energy for a given water flow in to the tank. This means that one can individually adjust the water current and the water flow in the tank as required or as determined for the fish/organisms.

The shield will increase the mixing zone between inlet and old/existing water in the tank. This is because the inlet water is introduced over a larger area and the contact between the existing tank water and the inlet water is greater than if it is introduced through holes directly in to the water volume. This way of introducing inlet water into a tank will contribute to lower gas/$O_2$ gradients in the tank. This is important when water with high concentration of $O_2$/gas is introduced in to a tank with living organisms.

With the shield it provides the opportunity for self-cleaning of the tank, leading to improved hygiene, without having to include concentrated jet streams in to the water column. This is extremely important for breeding of fish and other organisms that live in water, and that are sensitive to the physical strains caused by jet streams. As an example: Marine fish larvae (Cod, Sea bass, Sea bream).

With the adjustable shield the flow in the tank can be affected in a desired manner. The shield can be broader or smaller than the surrounded element. In most cases the form of the shield corresponds to the form of the shielded element for enhancing the flow in the tank.

The water inlet arrangement can be manufactured from various materials. Preferably made from non-corrosive materials such as polypropylene, polyethylene, glass fibre or polyvinyl chloride.

Area of application can be in all situations where water is to be distributed in to a tank/pool/basin preferably in breeding of fish or other organisms living in water. The arrangement can be used for salt-water and for sweet-water. Marine and freshwater fishes can be reared with the arrangement.

The water inlet arrangement is especially well suited where water and gas are mixed before entering a fish tank.

The invention is further described by four figures. They show:

FIG. 1: The state of the art.

Figure 2:
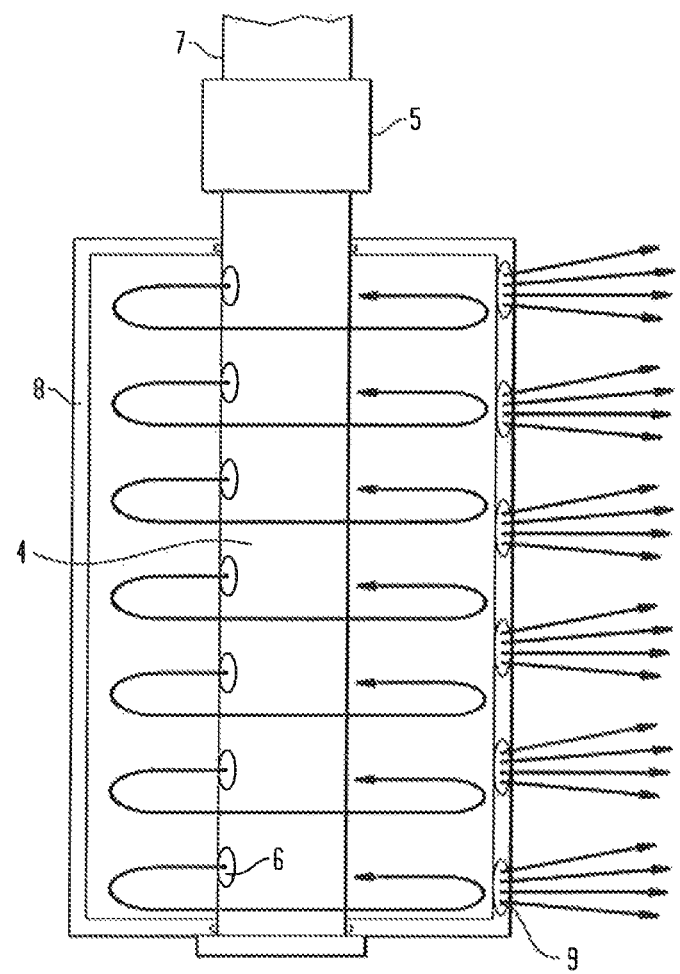

FIG. 2: The embodiment of the invention.

Figure 3A:
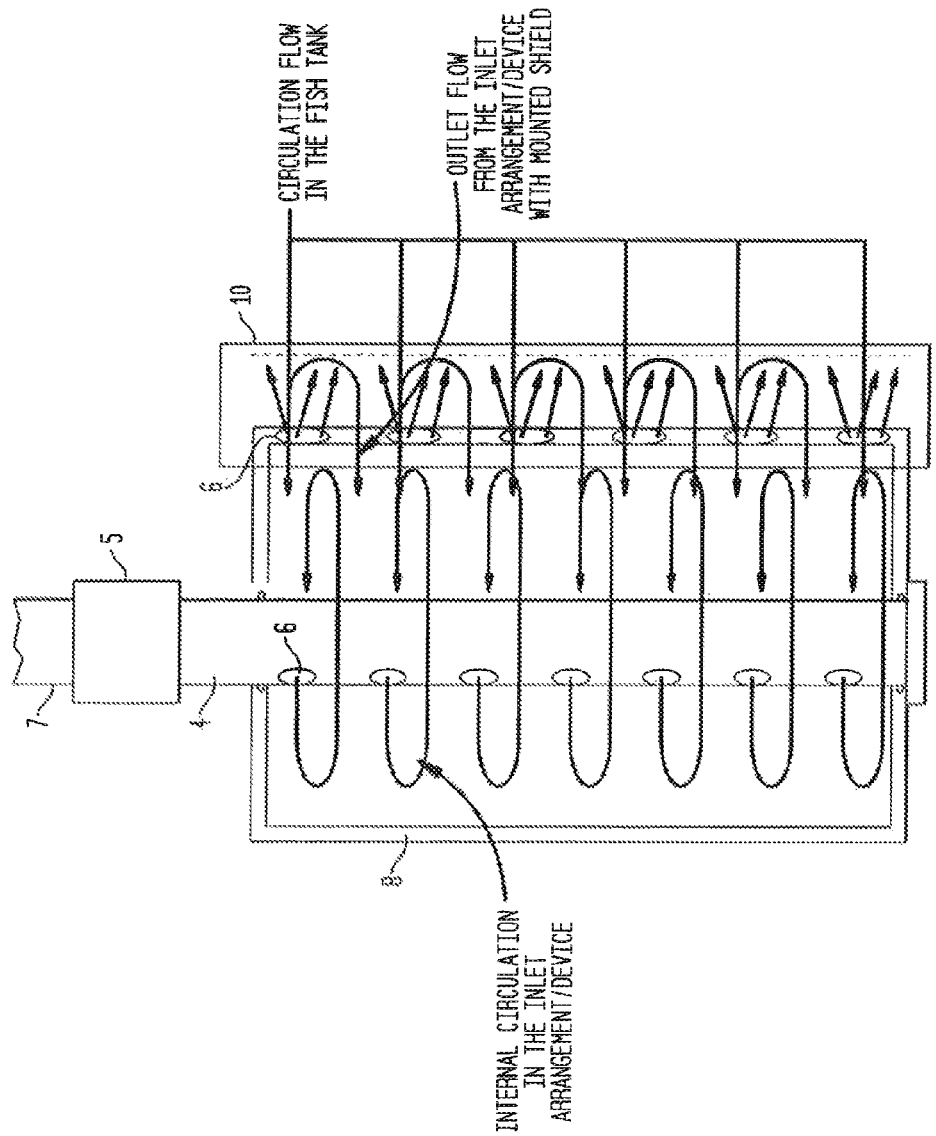

FIGS. 3A and B: A second embodiment of the invention.

FIGS. 4 A-F: Some examples of shields.

FIG. 1 shows the state of the art. It is an water inlet arrangement, also called slot tube or inlet pipe with an water inlet on the top, a flange or bushing and a pipe with a row of openings. The water is fed into the tank through this pipe and the flow out of the tube or pipe is larger at the bottom holes and lower at the upper holes. The different speeds are an major drawback of this arrangement.

FIG. 2 shows an embodiment of a water inlet arrangement or apparatus according to the invention. The pipe 4 is coupled with a muff coupling 5 to the water inlet pipe 7. The pipe 4 has a row of openings 6 for feeding the water into a tank. The pipe 4 is surrounded by the second element 8, which has the form of a cylinder and has also a row of openings 9 for feeding the water into the tank. The turbulence/rotation is generated by the differing orientation of the rows of holes 6, 9 of both the pipe 4 and the element 8.

FIGS. 3A and 3B show another embodiment of the invention. In FIG. 3A the figure is drawn schematically and in FIG. 3B the embodiment is shown in tank 2. The invention shows the pipe 4, surrounded by the second element 8 and the openings 6 for feeding the water into the tank. This embodiment has additionally a shield 10. The shield can be of different shapes/forms. The shape/form should be designated so that the water jet streams are forced to bend and turn. The shield 10 surrounds the second element on that place where the openings 6 are arranged. Shown is the circulation flow in the fish tank which is affected by the new element. The shield 10 surrounds the second element 8 or (not shown) the pipe 4 with a circumferential-angle of 60° to 200°, preferred 90° to 180°, this means between a quarter to one half.

FIG. 4 A-F shows six different shields 10 which can be used for example according to the invention. All shields 10 are arranged in neighbourhood to the second element 8 and shield it against the flow in the fish tank 2. It can be adapted to the flow like the first example in FIG. 4A, or a segment of a circle like the one in FIG. 4B. The third in FIG. 4C shows a rectangular shield 10. The fourth in FIG. 4D is acute-angled, the fifth a polygonal one in FIG. 4E. The last one shown in FIG. 4F has the rounded shape. It is shown that a lot of forms can be chosen without departing from the invention.

What is claimed is:

1. A water inlet arrangement for use in a fish tank in aquaculture, comprising:
    a pipe to feed water into the fish tank, the pipe having a first plurality of openings therein, and
    a second element surrounding the pipe and spaced therefrom for providing a space between the pipe and the second element in which a volume of water is received from the first plurality of openings, the second element having a second plurality of openings therein directed into the fish tank and being rotatable in use with respect to the pipe to position the second plurality of openings for use at an orientation with respect to the first plurality of openings to effect water flow from said second element directly into the fish tank.

2. The water inlet arrangement according to claim 1, wherein at least one of the pipe and the second element comprise a cross section selected from the group consisting of a cylindrical shape, and a polygonal shape.

3. The water inlet arrangement according to claim 1, wherein the first plurality and the second plurality of the openings are each arranged in one row.

4. The water inlet arrangement according to claim 1, wherein the second plurality of openings of the second element are arranged in an outer shell of the second element.

5. The water inlet arrangement according to claim 1, wherein the second plurality of openings of the second element are oriented in a similar direction to the first plurality of openings of the pipe.

6. The water inlet arrangement according to claim 1, further comprising a shield surrounding a portion of a circumference of the second element where the second plurality of openings are arranged.

7. The water inlet arrangement according to claim 6, wherein the shield is spaced apart from the second plurality of openings of the second element.

8. A process for providing water to rear fish, comprising:
    feeding water to a fish tank through a pipe having a first plurality of openings therein;
    surrounding a portion of the pipe with an element in spaced relation with the pipe in the fish tank and having a second plurality of openings therein directed into the fish tank;
    providing a space between the pipe and the element for receiving a volume of water in the space from the first plurality of openings for preventing gas bubbles in said volume of water from coalescing; and
    rotating the element in the water with respect to the pipe to a select position in use with respect to the first plurality of openings in the pipe for feeding the volume of the water from said element directly into the fish tank for effecting circulation, rotation and turbulence of the water in the fish tank.

9. The process according to claim 8, further comprising shielding the element with a shield disposed upstream of the element for deflecting water flow in the fish tank from the element.

* * * * *